United States Patent [19]
Guerrini et al.

[11] Patent Number: 4,716,289
[45] Date of Patent: Dec. 29, 1987

[54] OBTURATOR DISC FOR AN OPTICAL TRANSDUCER

[75] Inventors: Giampaolo Guerrini, Ivrea; Emilio Caligaris Cappio, Biella, both of Italy

[73] Assignee: Ing. C. Olivetti & C., S.p.A., Ivrea, Italy

[21] Appl. No.: 728,865

[22] Filed: Apr. 30, 1985

[30] Foreign Application Priority Data

May 2, 1984 [IT] Italy ............................... 67437 A/84

[51] Int. Cl.⁴ ............................................... G01D 5/34
[52] U.S. Cl. .......................... 250/231 SE; 250/237 G
[58] Field of Search ................. 250/231 SE, 237 G; 340/347 P; 356/374, 395; 235/487, 488

[56] References Cited

U.S. PATENT DOCUMENTS

| 3,983,391 | 9/1976 | Clemons | 250/237 G |
| 4,182,953 | 1/1980 | Hurley, III et al. | 250/231 SE |
| 4,230,939 | 10/1980 | de Bont et al. | 235/488 |
| 4,286,871 | 9/1981 | Erickson | 250/237 G X |
| 4,465,928 | 8/1984 | Breslow | 250/231 SE |

Primary Examiner—Eugene R. LaRoche
Assistant Examiner—Steven J. Mottola
Attorney, Agent, or Firm—Banner, Birch, McKie & Beckett

[57] ABSTRACT

An obturator disc comprising a cylindrical element (11) of transparent plastic material provided with a unitary hub (13) by means of which it can be connected to a rotating member. To a front surface (14) of the cylindrical element there is applied, by a photographic process, a layer of opaque material in an annular zone of which there is formed a plurality of transparent windows (16) of high definition.

8 Claims, 4 Drawing Figures

OBTURATOR DISC FOR AN OPTICAL TRANSDUCER

BACKGROUND OF THE INVENTION

The present invention relates to an obturator disc for an optical transducer of known type, for example, of the type described in the U.S. patent application Ser. No. 678,994 filed on Dec. 6, 1984 and assigned to the same assignee of the present invention. The obturator disc according to the invention comprises a cylindrical element of transparent material provided with a central hub for fitting the disc on to a rotating member, and a layer of opaque material on a front surface of the cylindrical element and provided with a plurality of transparent windows disposed radially along an annular zone coaxial with the central hub.

An obturator disc is known wherein the cylindrical element is of glass and the layer of opaque material is constituted by a thin film on a surface of the glass. In this disc, the central hub is formed by a pair of metal flanges which are connected to the cylindrical element. This obturator disc, however, proves to be costly and requires accurate centering between the hub and the glass element so that the windows in the film may be perfectly coaxial with the axis of the hub.

SUMMARY OF THE INVENTION

These drawbacks are obviated by the obturator disc according to the invention, which is characterised in that the cylindrical element is of plastics material and is moulded so as to comprise the central hub, and the layer of opaque material comprises a deposit of photosensitive material.

The invention will be described in more detail by way of example and with reference to the accompanying drawings.

DESCRIPTION OF THE PREFERRED EMBODIMENTS

Figure 1:
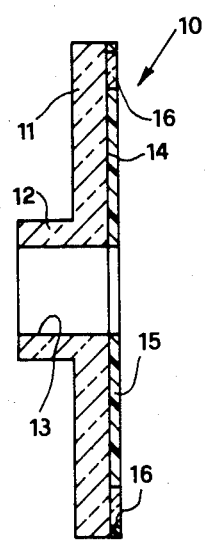
FIG. 1 is a cross-section of an obturator disc according to the invention in a first embodiment.
Figure 2:
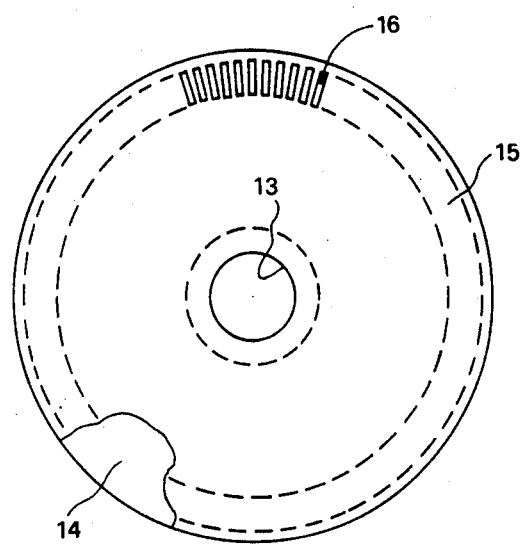
FIG. 2 is a front view of the obturator disc of FIG. 1.

Referring to FIGS. 1 and 2, an obturator disc 10 comprises a cylindrical element 11 of transparent plastics material, such as, for example, polycarbonate or methacrylate, moulded so as to comprise a central hub 12 provided with a through hole 13 by means of which it can be connected to a rotating member. On a front surface 14 of the cylindrical element 11 there is a layer 15 of opaque material such as not to allow the passage of infrared rays. A plurality of transparent windows 16 is formed in the layer 15. The windows 16 are disposed in a circular ring substantially coaxial with the axis of the central hub 12.

In accordance with a first embodiment of the present invention, the layer 15 is produced by depositing photosensitive material such as, for example, a gelatine with a base of silver salts, or any other photographic emulsion of known type, on the front surface 14.

The layer of deposited material is then exposed to light and exposed through a pattern mask in which there has been preformed the image to be reproduced, that is the radial windows 16 and other possible obturation elements.

Figure 3:
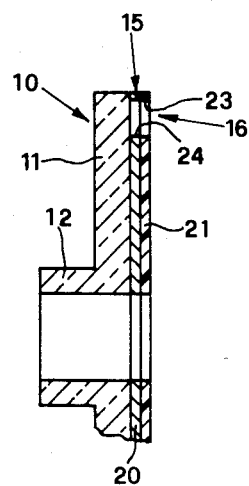
FIG. 3 is a partial cross-section of an obturator disc in a second embodiment.

According to another embodiments, the layer 15 is obtained by depositing a first metallic sub-layer 20 (FIG. 3) with a thickness of some microns on the front surface 14, for example, by electrolytic deposition. On the sub-layer 20, a photographic resist 21 is then deposited, also with a thickness of some microns, the resist having the property of polymerizing when it is struck by light.

The layer 21 is then exposed through an appropriate pattern mask and thereafter attacked with a suitable solvent which causes the removal of those resist portions which are not polymerized by the light, thus creating radial apertures 23 in the photographic resist.

Through the radial apertures 23 in the resist 21 the metallic sub-layer 20 is then chemically etched away so as to obtain corresponding radial apertures 24 in the latter. The apertures 23 and 24 define the windows 16.

Alternatively, to produce the sub-layer 20, in place of the metal there may be used an opaque lacquer which is deposited on the front surface 14 of the cylindrical element 11.

Figure 4:
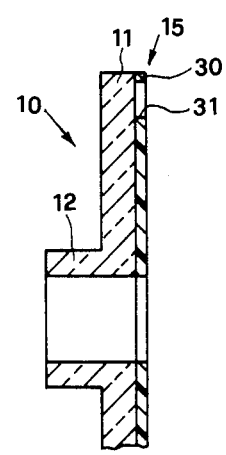
FIG. 4 is partial cross-section of an obturator disc in a third embodiment.

In accordance with a third embodiment, the layer 15 (FIG. 4) is obtained by depositing on the surface 14 a solution of photographic resist 30 already mixed with substances which do not allow the passage of infrared rays. In this case, by exposing the resist 30 using a suitable pattern mask, radial apertures 31 which define the windows 16 are produced in the resist solution.

According to a fourth embodiment, the layer 15 of the obturator disc is obtained by depositing the photographic resist 21 directly on the front surface 14 of the element 11. The resist is then exposed using the pattern mask, thus polymerizing the parts exposed to the light, after which the resist 21 is attacked with a solvent which removes the unpolymerized parts thereof, thus producing the windows 16. Finally, the remaining resist is rendered opaque by using ink or dye, to render the resist itself opaque to infrared rays.

By using any one of the methods described, radial windows 16 of high definition can be obtained, each having a width of less than one tenth of a millimeter.

What we claim is:

1. An obturator disc for an optical transducer comprising:
    a cylindrical element of transparent plastic material having a front surface, and a central hub projecting from a rear surface opposite to said front surface and provided with a through hole for fitting the cylindrical element to a rotating member, wherein the central hub and the cylindrical element with its front surface are obtained as a single moulding; and
    a layer of opaque material fixed on the front surface of said cylindrical element to define said obturator disc;
    wherein said layer of opaque material comprises a deposit of photosensitive material provided with a plurality of transparent radial windows disposed along an annular zone of said front surface coaxial with an axis of the through hole of said central hub; and
    wherein said radial windows are obtained by exposition of said photosensitive material to light and through a pattern mask coaxial with the axis of the through hole of said central hub and in which have been preformed said radial windows.

2. An obturator disc according to claim 1, wherein said photosensitive material comprises a photographic emulsion.

3. An obturator disc according to claim 1, wherein said photosensitive material comprises a gelatine with a base of silver salts.

4. An obturator disc according to claim 1, wherein said layer (15) of opaque material comprises a metallic sub-layer (20) fixed on said front surface (14) and a layer (21) of photographic resist deposited on said metallic sub-layer.

5. An obturator disc according to claim 4, wherein said transparent windows (16) are obtained by polymerizing said photographic resist and thereafter attacking said resist and said sub-layer with chemical solvents.

6. An obturator disc according to claim 1, wherein said layer (15) of opaque material comprises a sub-layer of opaque lacquer (20) fixed on said front surface (14) and a layer (21) of photographic resist deposited on said lacquer (20).

7. An obturator disc according to claim 6, wherein said transparent windows (16) are obtained by polymerizing said photographic resist and thereafter attacking said resist and said sub-layer with chemical solvents.

8. An obturator disc according to claim 1, wherein said layer (15) comprises a solution of photographic resist which is mixed with substances which do not allow the passage of infrared rays.

* * * * *